US011931944B2

(12) United States Patent
Jambois et al.

(10) Patent No.: US 11,931,944 B2
(45) Date of Patent: Mar. 19, 2024

(54) PULTRUSION WITH ABRASION RESISTANT FINISH

(71) Applicant: Tecton Products, LLC, Fargo, ND (US)

(72) Inventors: John Jambois, Fargo, ND (US); Jay Mosbrucker, West Fargo, ND (US); Aaron H. Johnson, Fargo, ND (US); Heather Goulet, Wolverton, MN (US); Brian Johnson, Kindred, ND (US)

(73) Assignee: Tecton Products, LLC, Fargo, ND (US)

(*) Notice: Subject to any disclaimer, the term of this patent is extended or adjusted under 35 U.S.C. 154(b) by 694 days.

(21) Appl. No.: 17/032,408

(22) Filed: Sep. 25, 2020

(65) Prior Publication Data

US 2021/0008778 A1 Jan. 14, 2021

Related U.S. Application Data

(63) Continuation of application No. 15/384,576, filed on Dec. 20, 2016, now Pat. No. 10,821,473, which is a (Continued)

(51) Int. Cl.
*B32B 27/20* (2006.01)
*B05D 1/26* (2006.01)
(Continued)

(52) U.S. Cl.
CPC ............ *B29C 48/12* (2019.02); *B05D 1/265* (2013.01); *B05D 7/54* (2013.01); *B29C 48/154* (2019.02);
(Continued)

(58) Field of Classification Search
CPC ..... B32B 27/20; B32B 27/08; B32B 2274/00; B32B 2307/536; B05D 1/265; B05D 7/54;
(Continued)

(56) References Cited

U.S. PATENT DOCUMENTS 4,427,823 A  1/1984  Inagaki et al.
5,700,578 A * 12/1997  Korney, Jr. ............ B32B 27/08
                                                        428/512
(Continued)

FOREIGN PATENT DOCUMENTS

JP  2004051946  2/2004
WO  2006137427  12/2006

OTHER PUBLICATIONS

"U.S. Appl. No. 12/204,940, Restriction Requirement dated Jun. 30, 2011", 7 pgs.

(Continued)

Primary Examiner — Monica A Huson
Assistant Examiner — Kelsey C Grace
(74) Attorney, Agent, or Firm — Schwegman, Lundberg & Woessner, P.A.

(57) ABSTRACT

A lineal product includes a composite pultruded substrate having a solid outer surface, and a multi-layer coating extruded directly onto the outer surface. The coating comprises a solid extruded base layer comprising a first thermoplastic material extruded onto the outer surface, the base layer having a base-layer inner surface in intimate contact with the outer surface and a base-layer outer interface. The coating further comprises a solid extruded outer layer comprising a second thermoplastic material comprising polymethyl methacrylate extruded onto the first thermoplastic material, the solid extruded outer layer having an outer-layer interface in intimate contact with the base-layer outer interface and an outer-layer outer surface, wherein the intimate contact between the base-layer outer interface and the outer-layer interface forms a solid interface between the base layer and the outer layer. The solid extruded outer layer has a hardness of at least 1H pencil hardness.

20 Claims, 6 Drawing Sheets

Related U.S. Application Data continuation of application No. 12/204,940, filed on Sep. 5, 2008, now abandoned.

(60) Provisional application No. 60/970,073, filed on Sep. 5, 2007.

(51) Int. Cl.
| | |
|---|---|
| *B05D 7/00* | (2006.01) |
| *B29C 48/12* | (2019.01) |
| *B29C 48/154* | (2019.01) |
| *B29C 48/155* | (2019.01) |
| *B29C 48/21* | (2019.01) |
| *B29C 48/30* | (2019.01) |
| *B29C 48/305* | (2019.01) |
| *B29C 70/08* | (2006.01) |
| *B29C 70/52* | (2006.01) |
| *B32B 27/08* | (2006.01) |
| B29C 48/07 | (2019.01) |
| B29K 105/06 | (2006.01) |
| B29K 105/10 | (2006.01) |
| B29K 309/08 | (2006.01) |

(52) U.S. Cl.
CPC ............ *B29C 48/155* (2019.02); *B29C 48/21* (2019.02); *B29C 48/30* (2019.02); *B29C 48/307* (2019.02); *B29C 70/086* (2013.01); *B29C 70/52* (2013.01); *B32B 27/08* (2013.01); *B32B 27/20* (2013.01); *B29C 48/07* (2019.02); *B29K 2105/06* (2013.01); *B29K 2105/10* (2013.01); *B29K 2309/08* (2013.01); *B29K 2995/007* (2013.01); *B32B 2274/00* (2013.01); *B32B 2307/536* (2013.01); *Y10T 428/254* (2015.01); *Y10T 428/31786* (2015.04); *Y10T 428/31855* (2015.04)

(58) Field of Classification Search
CPC ..... B29C 48/21; B29C 48/307; B29C 48/155; B29C 48/30; B29C 48/154; B29C 48/12; B29C 70/52; B29C 70/086; B29C 48/07; B29K 2309/08; B29K 2105/06; B29K 2995/007; B29K 2105/10; Y10T 428/31786; Y10T 428/254; Y10T 428/31855

See application file for complete search history.

(56) References Cited

U.S. PATENT DOCUMENTS

| | | | |
|---|---|---|---|
| 6,197,412 | B1 | 3/2001 | Jambois et al. |
| 6,777,089 | B1 | 8/2004 | Koniger et al. |
| 10,821,473 | B2 | 11/2020 | Jambois et al. |
| 2002/0072552 | A1 | 6/2002 | Wills et al. |
| 2002/0114951 | A1 | 8/2002 | Horansky |
| 2009/0081448 | A1 | 3/2009 | Jambois et al. |
| 2009/0086320 | A1* | 4/2009 | Yoshihara ............ G02B 1/14 359/615 |
| 2017/0165709 | A1 | 6/2017 | Jambois et al. |

OTHER PUBLICATIONS

"U.S. Appl. No. 12/204,940, Response filed Jul. 28, 2011 to Restriction Requirement dated Jun. 30, 2011", 5 pgs.
"U.S. Appl. No. 12/204,940, Non Final Office Action dated Aug. 16, 2011", 9 pgs.
"U.S. Appl. No. 12/204,940, Response filed Feb. 16, 2012 to Non Final Office Action dated Aug. 16, 2011", 8 pgs.
"U.S. Appl. No. 12/204,940, Final Office Action dated May 14, 2012", 9 pgs.
"U.S. Appl. No. 12/204,940, Response filed Nov. 12, 2012 to Final Office Action dated May 14, 2012", 7 pgs.
"U.S. Appl. No. 12/204,940, Non Final Office Action dated Nov. 23, 2012", 9 pgs.
"Academic Press Dictionary of Science and Technology", Primer Definition, Academic Press, (1992).
"Mexican Application Serial No. MX a 2008 011439, Office Action dated Nov. 29, 2012", 3 pgs.
"U.S. Appl. No. 12/204,940, Response filed May 23, 2013 to Non Final Office Action dated Nov. 23, 2012", 6 pgs.
"Mexican Application Serial No. MX a 2008 011439, Office Action dated Aug. 7, 2013", 2 pgs.
"U.S. Appl. No. 12/204,940, Final Office Action dated Aug. 28, 2013", 10 pgs.
"U.S. Appl. No. 12/204,940, Response filed Feb. 28, 2014 to Final Office Action dated Aug. 28, 2013", 7 pgs.
"U.S. Appl. No. 12/204,940, Non Final Office Action dated Jun. 6, 2014", 10 pgs.
"U.S. Appl. No. 12/204,940, Response filed Nov. 6, 2014 to Non Final Office Action dated Jun. 6, 2014", 8 pgs.
"U.S. Appl. No. 12/204,940, Final Office Action dated Jan. 2, 2015", 10 pgs.
"U.S. Appl. No. 12/204,940, Response filed Jun. 30, 2015 to Final Office Action dated Jan. 2, 2015", 10 pgs.
"U.S. Appl. No. 12/204,940, Non Final Office Action dated Aug. 14, 2015", 9 pgs.
"U.S. Appl. No. 12/204,940, Response filed Nov. 13, 2015 to Non Final Office Action dated Aug. 14, 2015", 9 pgs.
"U.S. Appl. No. 12/204,940, Final Office Action dated Feb. 19, 2016", 11 pgs.
"U.S. Appl. No. 12/204,940, Response filed Jul. 19, 2016 to Final Office Action dated Feb. 19, 2016", 14 pgs.
"U.S. Appl. No. 12/204,940, Advisory Action dated Aug. 3, 2016", 3 pgs.
"U.S. Appl. No. 12/204,940, Response filed Aug. 18, 2016 to Final Office Action dated Feb. 19, 2016", 15 pgs.
"U.S. Appl. No. 12/204,940, Non Final Office Action dated Sep. 20, 2016", 20 pgs.
"U.S. Appl. No. 15/384,576, Preliminary Amendment", 8 pgs.
"U.S. Appl. No. 15/384,576, Non Final Office Action dated Jun. 14, 2019", 13 pgs.
"U.S. Appl. No. 15/384,576, Response filed Sep. 16, 2019 to Non Final Office Action dated Jun. 14, 2019", 16 pgs.
"U.S. Appl. No. 15/384,576, Final Office Action dated Dec. 23, 2019", 15 pgs.
"U.S. Appl. No. 15/384,576, Response filed Jun. 9, 2020 to Final Office Action dated Dec. 23, 2019", 10 pgs.
"U.S. Appl. No. 15/384,576, Notice of Allowance dated Jul. 9, 2020", 8 pgs.

* cited by examiner

PULTRUSION WITH ABRASION RESISTANT FINISH

CROSS-REFERENCE TO RELATED APPLICATION

This application is a continuation of and claims the benefit of priority to U.S. application Ser. No. 15/384,576, filed on Dec. 20, 2016, entitled "METHOD OF APPLYING AN ABRASION RESISTANT FINISH ONTO A PULTRUSION SUBSTRATE," which is a continuation and claims the benefit of priority to U.S. application Ser. No. 12/204,940, filed on Sep. 5, 2008, entitled "PULTRUSION WITH ABRASION RESISTANT FINISH," which claims the benefit of priority to U.S. Provisional Application Ser. No. 60/970,073 filed on Sep. 5, 2007, entitled "PULTRUSION WITH ABRASION RESISTANT FINISH," the specifications of which are herein incorporated by reference in their entireties.

FIELD

This application generally relates to plastic components and more specifically to pultruded products.

BACKGROUND

The development of pultruded fiberglass reinforced plastics has evolved around the necessity for linear shapes that require high strength to weight ratios and cost effective manufacture of complex lineal shapes. Furthermore, fiberglass reinforced plastics have low thermal expansion that enables products to have a prolonged working life due to minimized thermal cycling stress on joints and seals. Applications that call for the virtues of composites include but are not limited to building products such as door frames, window frames, exterior trim and exterior siding.

With exterior applications comes a need for exterior durability. Also, there is a need for abrasion resistance, especially in dark colors. It is a known problem for dark colors to show flaws more readily than light colors. Light colors have more light scattering that blends in the glare that reflects from a scratch; whereas, dark colors absorb light around the scratch and reflect light on the edges. The contrast of a light colored scratch near a dark base is more perceptible to the human eye.

What is needed is a product that has the strength and low thermal expansion of pultrusion which also possess the ability to resist blemishes created after manufacture.

SUMMARY

A lineal product includes a substrate having an outer surface, a thermoplastic base layer applied to the outer surface, and a second thermoplastic layer applied over at least a portion of the base layer, the second layer having a hardness of at least 1H pencil hardness.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined or that other embodiments may be utilized and that structural changes may be made without departing from the spirit and scope of the present invention. The following detailed description is, therefore, not to be taken in a limiting sense, and the scope of the present invention is defined by the appended claims and their equivalents.

Figure 1:
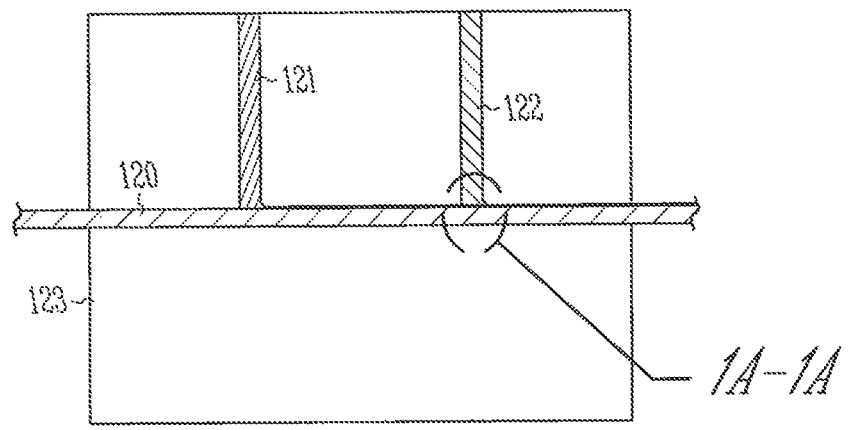
FIG. 1 shows a cross section of an extrusion die used to apply first and second layers of thermoplastic to a substrate, in accordance with one embodiment.

FIG. 1 shows a cross section of one embodiment of an extrusion die 123, in accordance with one embodiment. In this example, pultruded substrate 120 is pulled through the extrusion die 123. A base, first layer of thermoplastic 121 is forced to the surface of the pultruded substrate 120. The pultruded substrate 120 then continues through the extrusion die 123. Next, a second layer of thermoplastic 122 is forced onto the base layer of thermoplastic 121. The second layer of thermoplastic 122 covers at least a portion of the base layer of thermoplastic 121. The second layer 122 can be an outer layer that provides the proper hardness to protect the part from showing scratches.

Figure 1A:
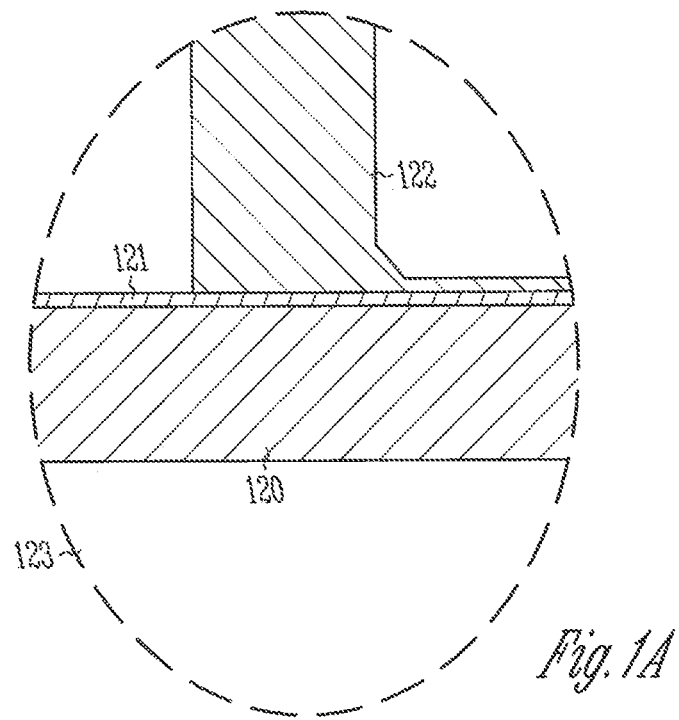
FIG. 1A shows in detail a part of the die of FIG. 1 where the second layer of thermoplastic is applied to the base layer of thermoplastic, in accordance with one embodiment.

FIG. 1A shows a detail view of FIG. 1. The pultruded substrate 120 is traveling through the extrusion die 123. For example, pultruded substrate 120 can include a fiber reinforced thermoset resin. The pultruded substrate has the base layer of thermoplastic 121 and the second layer of thermoplastic 122 is being forced onto the base layer of thermoplastic 121.

In one embodiment, the pultruded substrate 120 is coextruded with the base layer of thermoplastic 121 taking the shape of the pultruded substrate 120 and being approximately 3-5 mils in thickness. Some embodiments include a base layer 121 having a thickness of between approximately 1 mil to 20 mils. After the base layer of thermoplastic 121 is applied the second, outer layer of thermoplastic 122 is coextruded over the base layer of thermoplastic 121, and having a thickness of approximately 1-2 mils thick. Some embodiments include a second layer 122 having a thickness of between approximately 1 mil to 20 mils. In some embodiments, the second layer of thermoplastic can be softer or harder than the substrate layer.

For maximum scratch and abrasion resistance the second layer of thermoplastic 122 can be 5H pencil hardness or harder, for example. Using a second, relatively harder outer layer of thermoplastic 122 minimizes the visibility of a scratch or mar thus making a product that is resistant to blemishes. Some embodiments use a second layer 122 having a hardness of 1H pencil hardness or harder; some embodiments use a second layer 122 having a hardness of 2H pencil hardness or harder; some embodiments use a second layer having a hardness of 3H pencil hardness or harder; some embodiments use a second layer having a hardness of 4H pencil hardness or harder. The hardness of the second layer 122 is chosen to be hard enough to prevent scratches during normal use of the pultruded part, whether the pultruded part is used as door trim, window trim, siding, or other use.

In some embodiments, the pultruded part can include dark colors or light colors. For example, substrate 120 can include dark colors and/or light colors, base layer 121 can include dark colors and/or light colors, and second, outer layer 122 can include a clear coating. In other embodiments, the second layer 122 can also include dark colors. Used herein, dark colors refers to any non-clear colored layer and can include layers having multiple colors and textures. For example, dark colors can include light brown, dark brown, black, red, maroon, blue, or other colors. When the pultruded substrate 120 and/or base layer 121 include dark colors and the hard outer layer 122 is clear, the final product pultruded part provides for an aesthetic dark product that is scratch resistant due to the hard, clear outer layer. Used herein, clear means that the layer is substantially free of pigments such that the layer is substantially transparent so as to allow the base layer to be seen through the clear layer.

In some embodiments base layer 121 includes a thermoplastic including fillers and pigments to add color and to make it adhere to the surface of the pultruded substrate.

In some embodiments, outer layer 122 includes a thermoplastic and includes little if any fillers or pigments. The thermoplastic layer 122 can include a material such as a high molecular weight polymer such as a polymethyl methacrylate, or a high molecular weight acrylic polymer. In some embodiments thermoplastic layers 121 or 122 can include thermoplastic polymers such as polyesters, polyethylene, polypropylene, polystyrene, polyvinylchloride, polyphenylene oxide, polysulfones, polyaryl ethers, polyaryl sulfones, polycarbonates, polyurethane, polyacrylates such as polymethyl methacrylate, polymethyl acrylate and polyacetyls.

Figure 2:
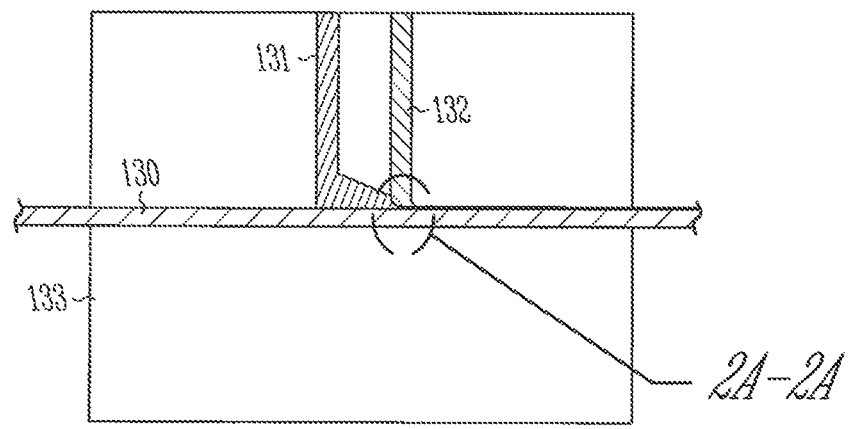
FIG. 2 shows a cross section of an extrusion die used to apply first and second layers of thermoplastic to a substrate, in accordance with one embodiment.

FIG. 2 shows a cross section of one embodiment of an extrusion die 133, in accordance with one embodiment. A pultruded substrate 130 is pulled through the extrusion die 133. A base layer of thermoplastic 131 is first applied onto the pultruded substrate 130. A second layer of thermoplastic 132 is applied onto the base layer of thermoplastic 131. The second layer of thermoplastic 132 covers the base layer of thermoplastic 131. Both the base layer of thermoplastic 131 and the second layer of thermoplastic 132 are then forced onto the pultruded substrate 130.

Figure 2A:
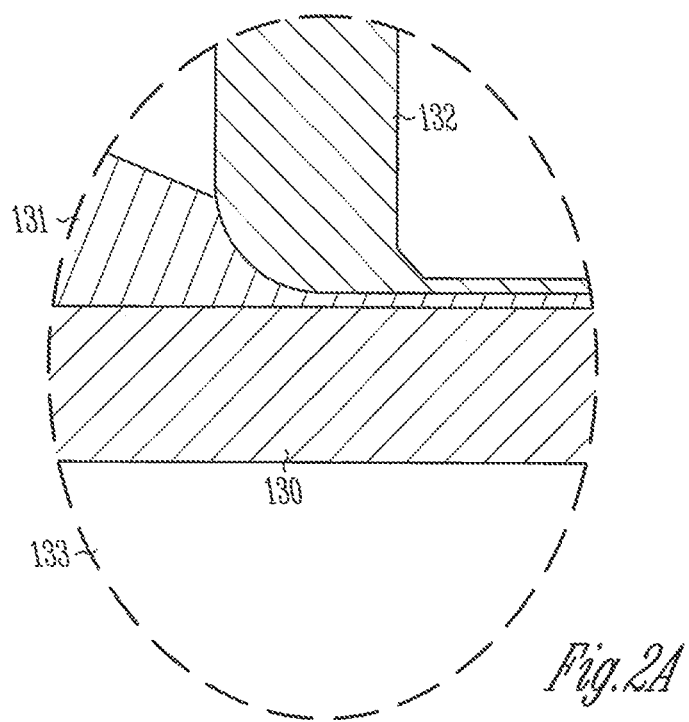
FIG. 2A shows in detail a part of the die of FIG. 2 where the two layers of thermoplastic are applied to the pultruded substrate, in accordance with one embodiment.

FIG. 2A shows a detail view of FIG. 2. The pultruded substrate 130 is traveling through the extrusion die 133. The pultruded substrate 130 has the base layer of thermoplastic 131 already applied. The second layer of thermoplastic 132 is applied to the base layer of thermoplastic 131. Both the base layer of thermoplastic 131 and the second layer of thermoplastic 132 are forced onto the pultruded substrate 130. Base layer 130 and second layer 132 can include the same thicknesses and hardness as discussed above for FIGS. 1 and 1A.

Figure 3:
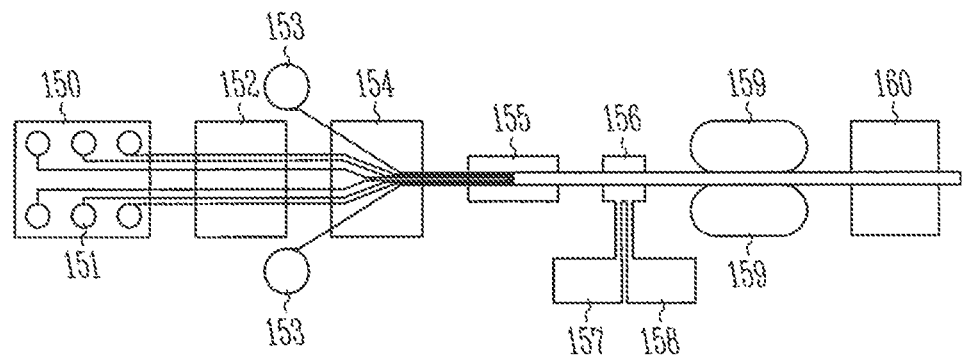
FIG. 3 shows a schematic setup for a pultrusion, in accordance with one embodiment.

FIG. 3 illustrates a pultrusion process, in accordance with one embodiment. The pultrusion process is used to create fiber reinforced plastic parts with a constant cross section. The pultrusion process begins with packages 151 of spooled rovings. A roving is composed of numerous amounts of fibers (typically glass fiber). The packages 151 are held by creels 150. The rovings are guided from the creels 150 through a resin impregnation fixture 152. The rovings are combined with rolls 153 of mat, veils, weave, or combination of fabric in the forming fixture 154. The formed rovings and fabric enter a curing or pultrusion die 155 where the shape of the fiber reinforced composite is determined. To instigate cure, the pultrusion die 155 is heated in the range of 100 to 700° F. The cured part then enters an extrusion die 156.

In die 156, a first extruder 157 forces a base layer of coating (such as base layer 121 of FIG. 1) into the extrusion die 156. A second extruder 158 forces a second, outer layer of coating (such as second layer 122 of FIG. 1) into the extrusion die 156. The process of applying the coatings to the pultruded substrate has been described in FIGS. 1, 1A, 2, and 2A, discussed above. A puller mechanism 159 is the component that drives the pultrusion process. The puller mechanism 159 can either be a reciprocating clamp or a continuous type puller. A saw 160 or other type of fabrication equipment cuts the pultruded part. In addition to pultrusion, aluminum extrusion, roll formed steel, and plastic extrusion can adopt this coating system by persons skilled in the individual art.

Figure 4:
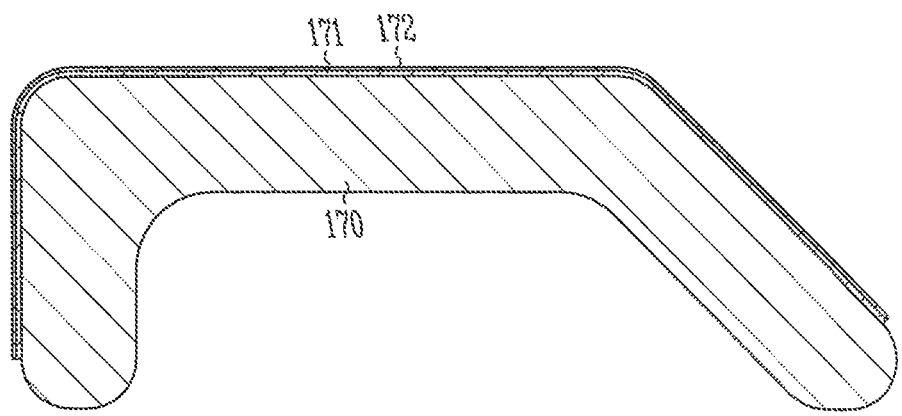
FIG. 4 shows a cross section of a pultruded part where first and second layers of thermoplastic follow the contours of the pultruded substrate, in accordance with one embodiment.

FIG. 4 shows one embodiment where a pultruded substrate 170 is coated with a base layer of thermoplastic 171 and a second layer of thermoplastic 172. Both the base layer of thermoplastic 171 and the second layer of thermoplastic 172 follow the contours of the pultruded substrate 170. Layers 171 and 172 can be similar to layers 121 and 122, as discussed above.

Figure 5:
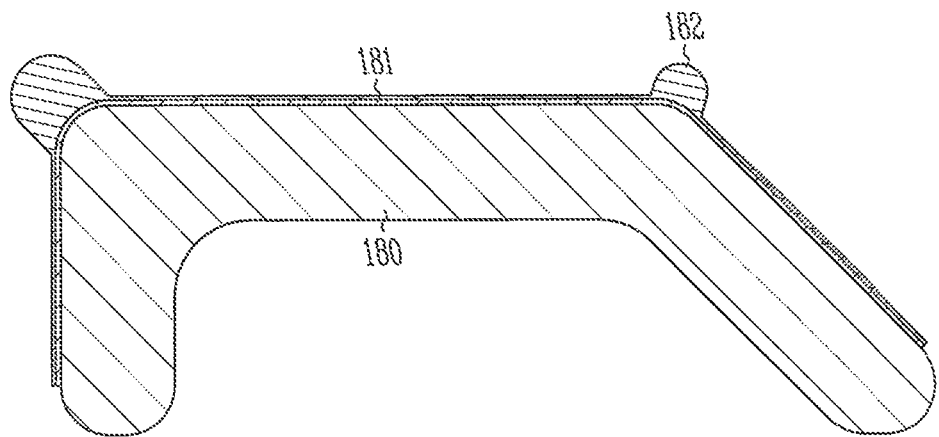
FIG. 5 shows a cross section of a pultruded part where a base layer of thermoplastic follows the contour of the pultruded substrate, while a second layer of thermoplastic follows the contour of the pultruded substrate, but also defines some of the details of the final part, in accordance with one embodiment.

FIG. 5 shows one embodiment where a pultruded substrate 180 is coated with a base layer of thermoplastic 181 and a second layer of thermoplastic 182. The base layer of thermoplastic 181 follows the contours of the pultruded substrate 180, while the second layer of thermoplastic 182 follows some of the contours of the pultruded substrate 180, but also defines some of the details in the pultruded substrate 180. Layers 181 and 182 can be similar to layers 121 and 122, as discussed above.

Figure 6:
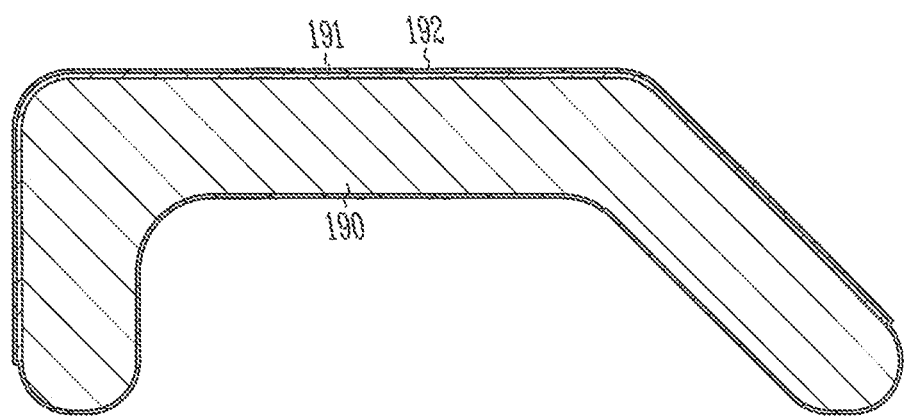
FIG. 6 shows a cross section of a pultruded part where a base layer of thermoplastic covers less than the entire surface and a second layer of thermoplastic covers the entire surface, in accordance with one embodiment.

FIG. 6 shows one embodiment of the invention where a pultruded substrate 190 is coated with a base layer of thermoplastic 191 and a second layer of thermoplastic 192. The base layer of thermoplastic 191 covers less then the entire surface of the pultruded substrate 190, while the second layer of thermoplastic 192 covers the entire surface of the pultruded substrate 190. Layers 191 and 192 can be similar to layers 121 and 122, as discussed above.

Figure 7:
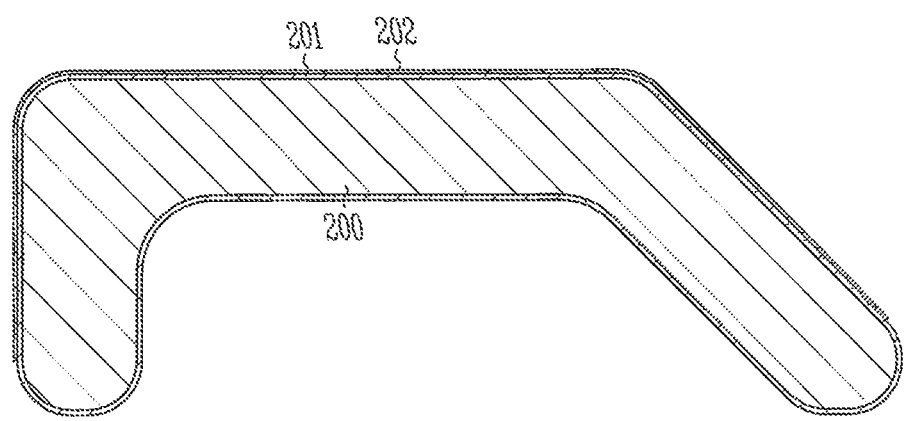
FIG. 7 shows a cross section of a pultruded substrate where a base layer of thermoplastic covers the entire surface and a second layer of thermoplastic covers less than the entire surface, in accordance with one embodiment.

FIG. 7 shows one embodiment where a pultruded substrate 200 is coated with a base layer of thermoplastic 201 and a second layer of thermoplastic 202. The base layer of thermoplastic 201 covers the entire surface of the pultruded substrate 200, while the second layer of thermoplastic 202 covers less then the entire surface of the pultruded substrate 200. Layers 201 and 202 can be similar to layers 121 and 122, as discussed above.

In various embodiments, the above system can apply to a lineal product including: a) pultruded composite; b) extruded aluminum; c) roll formed steel; or d) extruded plastic. In some embodiments, the lineal product is finished with a die applied multilayer thermoplastic coating. In some embodiments, a thermoplastic base layer follows the contours of the surface of the profile. In some embodiments, a thermoplastic second, outer layer follows the contours of the surface of the profile. In some embodiments, the thermoplastic second layer defines detail features of the profile. In some embodiments, the thermoplastic coating layers cover less then the entire second surface of the profile. In some embodiments, the thermoplastic coating layers cover the entire outer surface of the profile. In some embodiments, the thermoplastic base layer covers less then the entire outer surface of the profile and the thermoplastic second layer covers the entire outer surface of the profile. In some embodiments, the thermoplastic base layer covers the entire outer surface of the profile and the thermoplastic second layer covers less then the entire outer surface of the profile. In some embodiments, a method includes applying a multilayer thermoplastic finish to a lineal product.

In some embodiments, a pultruded part is coextruded with a dark colored base layer of thermoplastic taking the shape of the pultruded substrate and being approximately 3-5 mils in thickness. After the base layer of thermoplastic is applied a second, outer layer of clear thermoplastic is co-extruded over the base layer of thermoplastic, and having a thickness of approximately 1-2 mils thick. In one embodiment, a base layer of thermoplastic is simultaneously coextruded with a second layer of thermoplastic before being drawn onto a pultruded substrate.

In one embodiment, a pultruded part is coextruded with a base layer of thermoplastic taking the shape of the pultruded substrate substantially 3-5 mils in thickness. After the base layer of thermoplastic is applied a second, outer layer of thermoplastic is coextruded over the base layer of thermoplastic in a fashion that defines the final shape or a detail feature of the part. In some embodiments, the second layer of thermoplastic can be softer or harder than the substrate layer.

For maximum scratch resistance the second, outer layer of thermoplastic can be 5H pencil hardness or harder, for example. Using a second, outer layer of thermoplastic minimizes the visibility of a scratch or mar thus making a product that is resistant to blemishes. Some embodiments use a second layer having a hardness of 1H pencil hardness or harder; some embodiments use a second layer having a hardness of 2H pencil hardness or harder; some embodiments use a second layer having a hardness of 3H pencil hardness or harder; some embodiments use a second layer having a hardness of 4H pencil hardness or harder.

Figure 8:
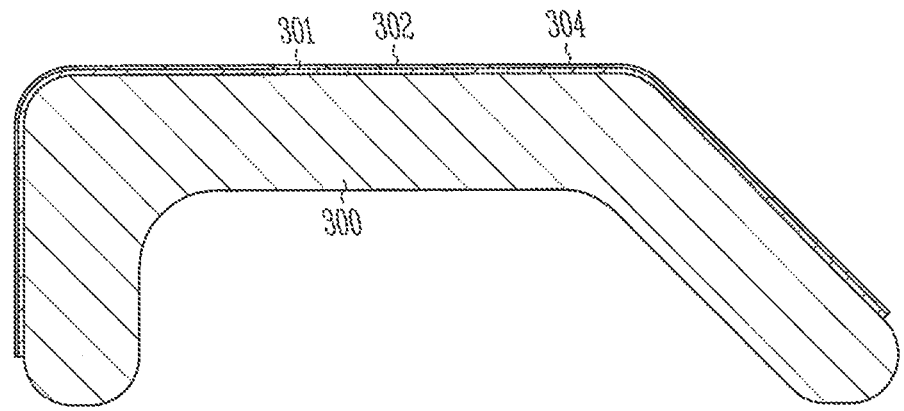
FIG. 8 shows a cross section of a pultruded substrate, in accordance with one embodiment.

FIG. 8 shows a cross section of a pultruded substrate 300, in accordance with one embodiment. Pultruded substrate 300 is coated with a base layer of thermoplastic 301 and a second layer of thermoplastic 302. Layer 301 can be similar to layer 121, as discussed above. In this embodiment, second, outer layer 302 includes a clear thermoplastic having a hardness such as discussed above for layer 122 (e.g., 5H pencil hardness), and additionally includes a plurality of micro-beads 304 to provide a lower gloss finish than the thermoplastic alone. Moreover, the microbeads 304 provide a much better low-angle glare than the outer layer without the micro-beads.

Figure 9:
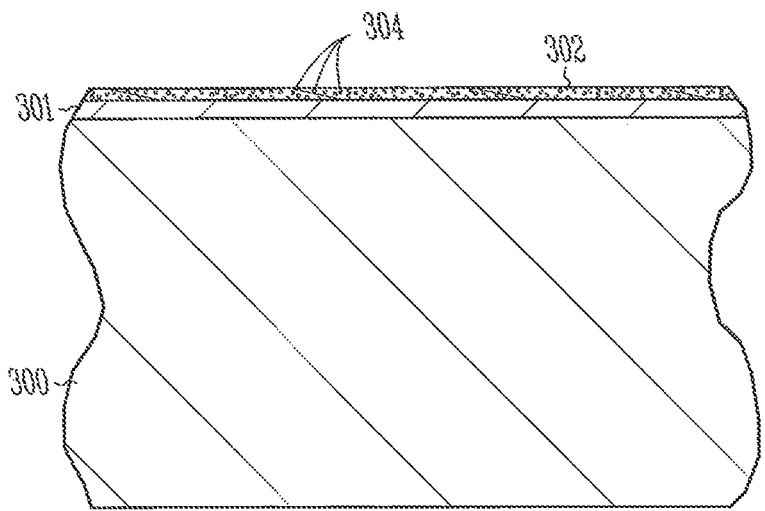
FIG. 9 shows further details of the pultruded substrate of FIG. 8.

FIG. 9 shows further details of pultruded substrate 300. A plurality of micro-beads 304 are homogeneously mixed throughout outer thermoplastic layer 302. Micro-beads 304 can be small glass, acrylic, or other material particles which are provided in the outer layer 302 at such a density so as to lower the gloss and low angle glare of the clear outer coating 302. For example, the micro-beads can have a size of about 10 microns to about 30 microns and can be provided at about a 10% density in the outer layer 302. Some embodiments have a micro-bead density of about 10% or less in the second layer 302.

Micro-beads 304 can be a cross-linked acrylic micro-bead or a finely ground cross-linked acrylic. The cross-linked microbeads 304 do not dissolve into the base clear acrylic layer 302 during extrusion. Because the microbeads 304 do not dissolve, they form a low gloss or textured surface when they exit the crosshead extrusion die. The textured surface eliminates the low angle (e.g., less than about 10 degrees) mirror like glare. The use of these beads also eliminates normal fingerprinting (oily fingers leaving a mark on the plastic) and makes a very scratch resistant surface.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A lineal product comprising:
  a composite pultruded substrate having a solid outer surface; and
  a multi-layer coating extruded directly onto the solid outer surface of the pultruded substrate, the coating comprising:
    a solid extruded base layer comprising a first thermoplastic material extruded onto the solid outer surface, the solid extruded base layer having a base-layer inner surface in intimate contact with the solid outer surface of the composite pultruded substrate and a base-layer outer interface; and
    a solid extruded outer layer comprising a second thermoplastic material comprising polymethyl methacrylate extruded onto the first thermoplastic material of the base layer, the solid extruded outer layer having an outer-layer inner interface in intimate contact with the base-layer outer interface and an outer-layer outer surface, wherein the intimate contact between the base-layer outer interface and the outer-layer inner interface forms a solid interface between the solid extruded base layer and the solid extruded outer layer,
    wherein the solid extruded outer layer has a hardness of at least 1H pencil hardness.

2. The lineal product of claim 1, wherein the first thermoplastic material comprises a colored thermoplastic.

3. The lineal product of claim 1, wherein the second thermoplastic material comprises a transparent, substantially transparent, or translucent thermoplastic.

4. The lineal product of claim 3, wherein the solid extruded outer layer has a hardness of at least 2H pencil hardness.

5. The lineal product of claim 3, wherein the solid extruded outer layer has a hardness of at least 3H pencil hardness.

6. A lineal product comprising:
a composite pultruded substrate having a solid outer surface; and
a coextruded multi-layer coating coextruded directly onto the solid outer surface of the composite pultruded substrate, the coextruded coating comprising:
   a solid extruded base layer comprising a first thermoplastic material extruded directly onto the solid outer surface, the solid extruded base layer having a base-layer inner surface in intimate contact with the solid outer surface of the composite pultruded substrate and a base-layer outer interface; and
   a solid coextruded outer layer comprising a second thermoplastic material comprising polymethyl methacrylate coextruded onto the first thermoplastic material of the base layer, the solid coextruded outer layer having an outer-layer interface in intimate contact with the base-layer outer interface and an outer-layer outer surface, wherein the intimate contact between the base-layer outer interface and the outer-layer interface forms a solid interface between the solid extruded base layer and the solid coextruded outer layer,
wherein the solid coextruded outer layer has a hardness of at least 4H pencil hardness.

7. The lineal product of claim 6, wherein the solid coextruded outer layer has a hardness of at least 5H pencil hardness.

8. A lineal product comprising:
a composite pultruded substrate comprising a fiber-reinforced thermoset resin, the composite pultruded substrate having a solid outer surface; and
a coextruded bilayer coating coextruded directly onto the solid outer surface of the composite pultruded substrate, the coextruded bilayer coating comprising:
   a solid extruded base layer comprising a colored thermoplastic material comprising polymethyl methacrylate extruded directly onto the solid outer surface, the solid extruded base layer having a base-layer inner surface in intimate contact with the solid outer surface of the composite pultruded substrate and a base-layer outer interface; and
   a solid coextruded outer layer comprising a clear thermoplastic material comprising polymethyl methacrylate coextruded onto the first thermoplastic material of the base layer, the solid coextruded outer layer having an outer-layer interface in intimate contact with the base-layer outer interface and an outer-layer outer surface, wherein the intimate contact between the base-layer outer interface and the outer-layer interface forms a solid interface between the solid extruded base layer and the solid coextruded outer layer,
wherein the solid coextruded outer layer has a hardness of at least 1H pencil hardness.

9. The lineal product of claim 8, wherein the solid coextruded outer layer has a hardness of at least 4H pencil hardness.

10. The lineal product of claim 8, wherein the solid coextruded outer layer has a hardness of at least 5H pencil hardness.

11. The lineal product of claim 1, wherein the solid coextruded outer layer includes a plurality of micro-beads.

12. The lineal product of claim 1, wherein the first thermoplastic material comprises polymethyl methacrylate.

13. The lineal product of claim 1, wherein one or both of the first thermoplastic material and the second thermoplastic material consists of polymethyl methacrylate.

14. The lineal product of claim 7, wherein the first thermoplastic material comprises a colored thermoplastic.

15. The lineal product of claim 1, wherein the second thermoplastic material comprises a transparent, substantially transparent, or translucent thermoplastic.

16. The lineal product of claim 6, wherein the first thermoplastic material comprises polymethyl methacrylate.

17. The lineal product of claim 6, wherein one or both of the first thermoplastic material and the second thermoplastic material consists of polymethyl methacrylate.

18. The linear product of claim 6, wherein the coextruded multi-layer coating is crosshead coextruded onto the solid outer surface of the composite pultruded substrate.

19. The lineal product of claim 8, wherein the first thermoplastic material comprises polymethyl methacrylate.

20. The lineal product of claim 8, wherein one or both of the first thermoplastic material and the second thermoplastic material consists of polymethyl methacrylate.

* * * * *